(12) United States Patent
Tamura et al.

(10) Patent No.: US 7,569,946 B2
(45) Date of Patent: Aug. 4, 2009

(54) TURBINE-GENERATOR EQUIPMENT AND INSTALLATION METHOD THEREOF

(75) Inventors: Tetsumasa Tamura, Tokyo (JP); Masayuki Yamakawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/878,770

(22) Filed: Jul. 26, 2007

(65) Prior Publication Data
US 2008/0036212 A1    Feb. 14, 2008

Related U.S. Application Data

(62) Division of application No. 10/198,747, filed on Jul. 19, 2002, now Pat. No. 7,256,511.

(30) Foreign Application Priority Data

Jul. 19, 2001 (JP) ............................ 2001-219234
Jul. 8, 2002 (JP) ............................ 2002-198146

(51) Int. Cl.
*F01D 15/10* (2006.01)
*F02C 6/00* (2006.01)
*H02K 7/18* (2006.01)
*H02P 9/04* (2006.01)

(52) U.S. Cl. ..................................................... 290/52

(58) Field of Classification Search ................. 290/52; 29/889.2, 602.1, 596, 854, 831; 60/39.02, 60/39.35, 797
See application file for complete search history.

(56) References Cited

U.S. PATENT DOCUMENTS

| | | | |
|---|---|---|---|
| 1,802,870 A | 4/1931 | Brown | |
| 3,140,821 A | 7/1964 | Weckert et al. | |
| 3,608,525 A | 9/1971 | Sharan | |
| 4,044,442 A | 8/1977 | Carlson | |
| 4,119,861 A | 10/1978 | Gocho | |
| 4,211,932 A | 7/1980 | Geary, Jr. | |
| 4,377,023 A | 3/1983 | Boesch | |
| 4,420,869 A | 12/1983 | Erkan et al. | |
| 4,590,653 A | 5/1986 | Ades et al. | |
| 4,625,269 A * | 11/1986 | Kanngiesser | 363/35 |
| 4,704,571 A | 11/1987 | Rosenberg | |
| 5,084,812 A | 1/1992 | Hausler et al. | |

(Continued)

FOREIGN PATENT DOCUMENTS

DE           3438452 A         3/1986

(Continued)

OTHER PUBLICATIONS

Modern Dictionary of Electronics, Rudolf F. Graf, 1999, Butterworth—Heinermann, Seventh Edition, pp. 782, 783.

*Primary Examiner*—Julio C. Gonzalez R.
(74) *Attorney, Agent, or Firm*—Foley & Lardner LLP (57) ABSTRACT

Installation method of turbine-generator equipment controlling a turbine-generator is described. The method includes manufacturing a thyristor excitation equipment as a package including a circuit breaker, an excitation transformer, a power rectifier coupled with the excitation transformer, and an excitation control panel controlling a thyristor ignition angle of the power rectifier. After the manufacturing, positioning the thyristor excitation equipment where the power rectifier is connectable to the turbine-generator, and after the positioning, wiring between the turbine-generator and the thyristor excitation equipment.

1 Claim, 5 Drawing Sheets

U.S. PATENT DOCUMENTS

| | | |
|---|---|---|
| 5,321,308 A | 6/1994 | Johncock |
| 5,383,652 A | 1/1995 | Van Den Berg |
| 5,416,398 A | 5/1995 | Blatter |
| 5,469,009 A * | 11/1995 | Wakui et al. ................ 310/214 |
| 5,530,617 A | 6/1996 | Bonavia et al. |
| 5,547,337 A | 8/1996 | Fork et al. |
| 5,559,421 A | 9/1996 | Miyakawa |
| 5,642,007 A * | 6/1997 | Gyugyi et al. .............. 307/102 |
| 5,694,026 A * | 12/1997 | Blanchet ...................... 322/29 |
| 6,064,172 A * | 5/2000 | Kuznetsov ................. 318/716 |
| 6,093,975 A | 7/2000 | Peticolas |
| 6,236,123 B1 | 5/2001 | Pinkerton |
| 6,279,309 B1 | 8/2001 | Lawlor et al. |
| 6,298,536 B1 | 10/2001 | Rossway et al. |
| 6,337,561 B1 | 1/2002 | Sudou et al. |
| 6,404,075 B1 | 6/2002 | Potter et al. |
| 6,410,992 B1 | 6/2002 | Wall et al. |
| 6,426,578 B1 | 7/2002 | Mori et al. |
| 6,460,325 B2 | 10/2002 | Liebig et al. |
| 6,489,692 B1 | 12/2002 | Gilbreth et al. |
| 6,563,228 B1 * | 5/2003 | Schlett .......................... 290/2 |
| 6,566,764 B2 | 5/2003 | Rebsdorf et al. |
| 6,603,795 B2 | 8/2003 | Ma et al. |
| 2001/0038544 A1 | 11/2001 | Ainsworth |
| 2003/0038483 A1 | 2/2003 | Klaar |
| 2003/0061819 A1 | 4/2003 | Kuruoki et al. |

FOREIGN PATENT DOCUMENTS

| | | |
|---|---|---|
| DE | 246692 A | 6/1987 |
| JP | 62000631 A * | 1/1987 |
| JP | 408033199 A | 2/1996 |
| JP | 09051696 A * | 2/1997 |
| JP | 409051696 A | 2/1997 |
| JP | 2000-252654 | 9/2000 |

* cited by examiner

TURBINE-GENERATOR EQUIPMENT AND INSTALLATION METHOD THEREOF

CROSS-REFERENCE TO RELATED APPLICATIONS

The present application is a divisional of U.S. application Ser. No. 10/198,747, the entire contents of which are incorporated herein by reference.

This application is based upon and claims the benefit of priority from the prior Japanese Patent Applications No. 2001-219234 filed on Jul. 19, 2001, and No. 2002-198146 filed on Jul. 8, 2002, the entire contents of which are incorporated herein by reference.

BACKGROUND OF THE INVENTION

1. Field of the Invention

This invention relates to turbine-generator equipment and a method of constructing turbine-generator equipment to control excitation of the turbine-generator (turbine-driven generator).

2. Description of the Related Art

Conventionally, there are two types of a turbine-generator equipment for generating alternating-current electric power, a direct-current (DC) excitation system and an alternating-current (AC) excitation system. Recently, however, thyristor direct excitation systems have been much adopted because of their excellence in controlling and their easy maintenance. In operating turbine-generator equipment, the equipment is updated and converted when the equipment is not operating. The update and conversion allow for coping with depletion of equipment components, for increasing the output of the excitation system of the generator according to an increase of the output of the generator, and for improving responsibility of the equipment to renew the system. In this case, the established equipment of the DC excitation system or AC excitation system is often removed and the thyristor direct excitation system equipment is installed.

Turbine-generator equipment of a direct-current system has a DC exciter, a DC circuit breaker, a DC excitation control panel and so on, and turbine-generator equipment of a alternating-current system has an AC exciter, a rectifier, an DC excitation control panel and so on. In case of changing one of these systems into a thyristor direct excitation system, after operation of the turbine-generator equipment is stopped, a decelerator or an AC exciter axially connected to a turbiegenerator is removed, and afterwards components of the thyristor direct excitation system is positioned around the foundation of the turbine-generator with arranging base of each component. That is, when converting turbine-generator equipment of either the direct-current excitation system or the alternating-current excitation system into the thyristor direct excitation system, the alternation of systems takes a long period of time, because any preliminary work including foundation construction of the components or the panel cannot be performed when the turbine-generator is operating. Moreover, since there are few open spaces around the foundation of the turbine-generator, the components or the panel are difficult to install additionally.

SUMMARY OF THE INVENTION

Accordingly, an object of this invention concerning turbine-generator equipment is to enable the conversion of a direct-current excitation system or an alternating-current excitation system into a thyristor direct excitation system in a short construction time, and to enable the additional easy installation of a device or a board.

According to one aspect of the present invention, there is provided a turbine-generator equipment controlling a turbine-generator comprising, a package including, a circuit breaker, an excitation transformer coupled with a main bus connected to the turbine-generator, a power rectifier coupled with the excitation transformer and coupled with the turbine-generator via the circuit breaker, and an excitation control panel which controls a thyristor ignition angle of the power rectifier to adjust an excitation amount of the turbine-generator.

According to another aspect of the present invention, there is provided a method of installing a turbine-generator equipment which controls a turbine-generator, including, manufacturing a thyristor excitation equipment, after the manufacturing, settling the thyristor excitation equipment where the power rectifier is connectable to the turbine-generator, and after the settling, wiring between the turbine-generator and the thyristor excitation equipment.

BRIEF DESCRIPTION OF THE DRAWINGS

Preferred embodiments of the present invention are illustrated in the accompanying drawings in which.

DETAILED DESCRIPTION OF THE INVENTION

Referring now to the drawings, wherein like reference numerals designate identical or corresponding parts throughout the several views, the embodiments of this invention will be described below.

First Embodiment

Figure 1:
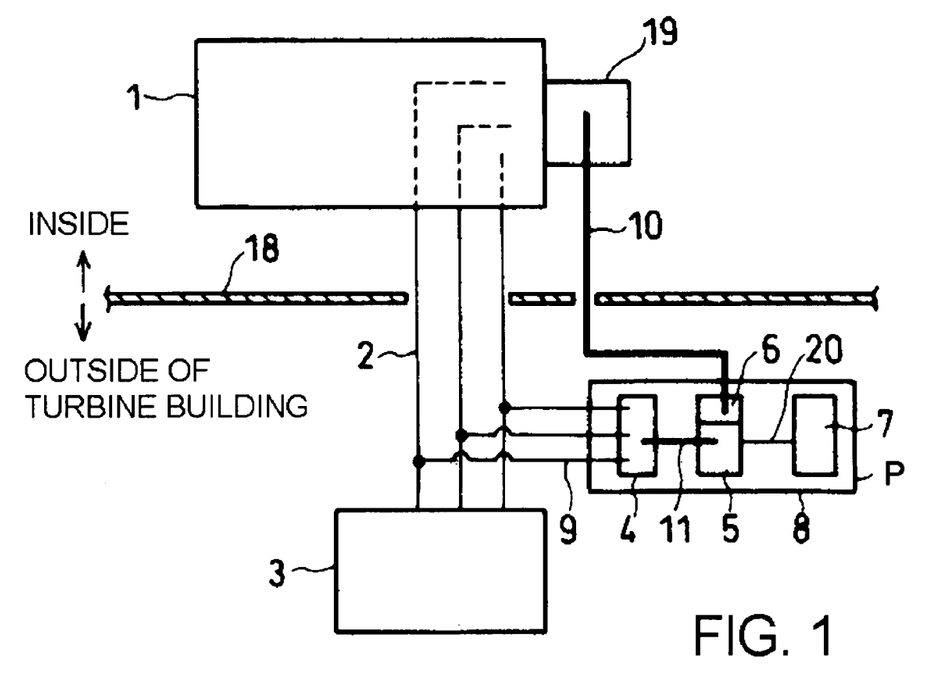
FIG. 1 is a schematic plan view of a main portion of turbine-generator equipment installed as a thyristor direct excitation system after the conversion according to a first embodiment of the invention.
Figure 2:
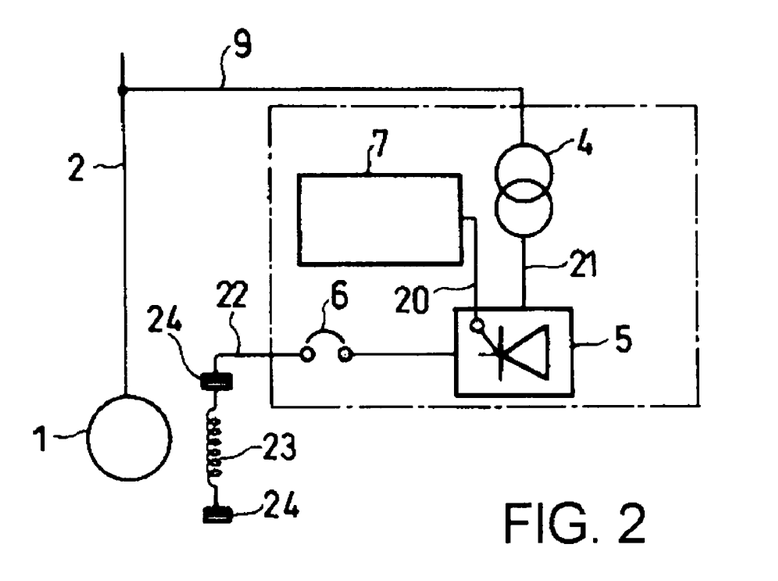
FIG. 2 is a single-line diagram of the turbine-generator equipment of the thyristor direct excitation system corresponding to FIG. 1.
Figure 3:
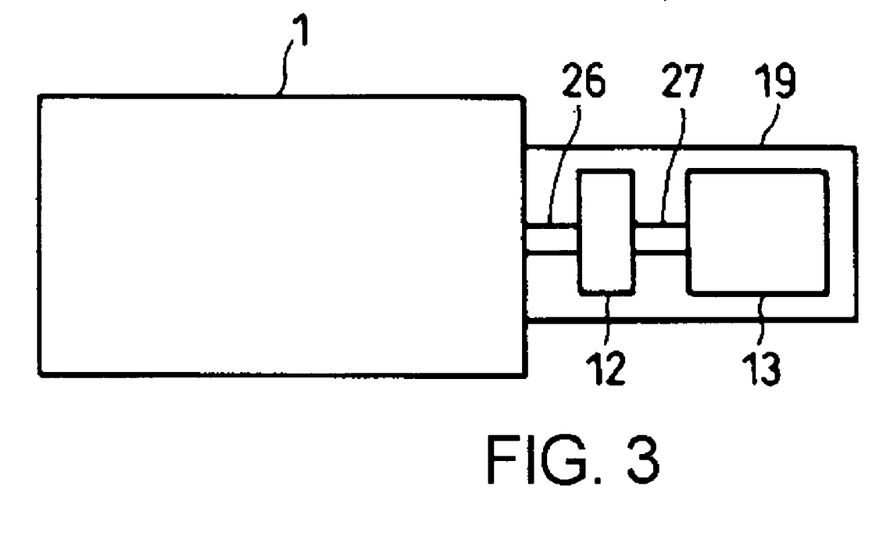
FIG. 3 is a schematic plan view of a main portion of the turbine-generator equipment of the direct-current excitation system before the conversion according to the first embodiment of the invention.
Figure 4:
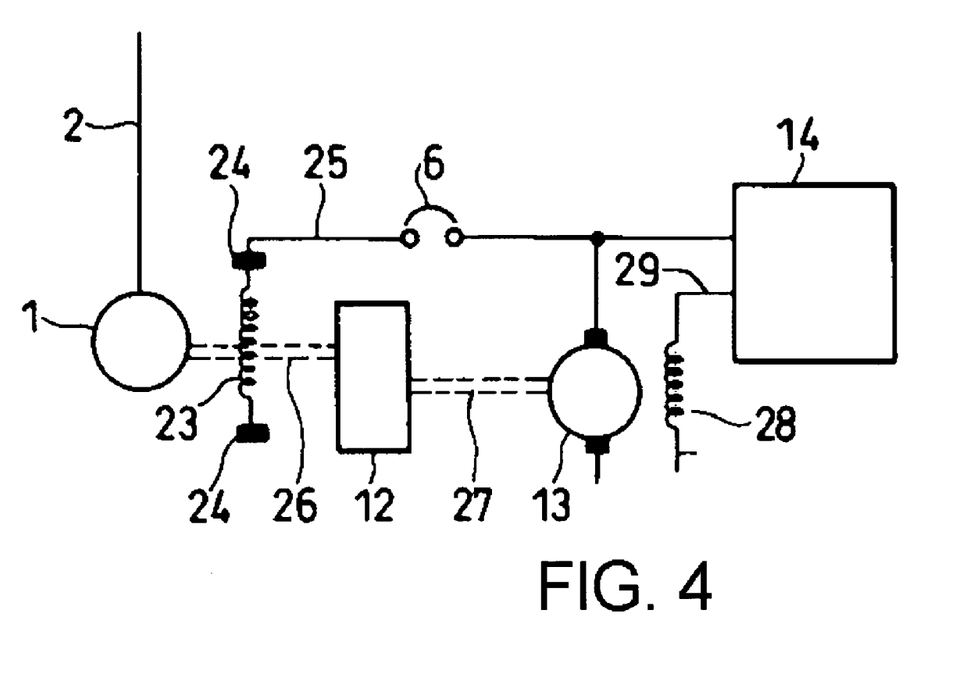
FIG. 4 is a single-line diagram of the direct-current excitation system corresponding to FIG. 3.
Figure 5:
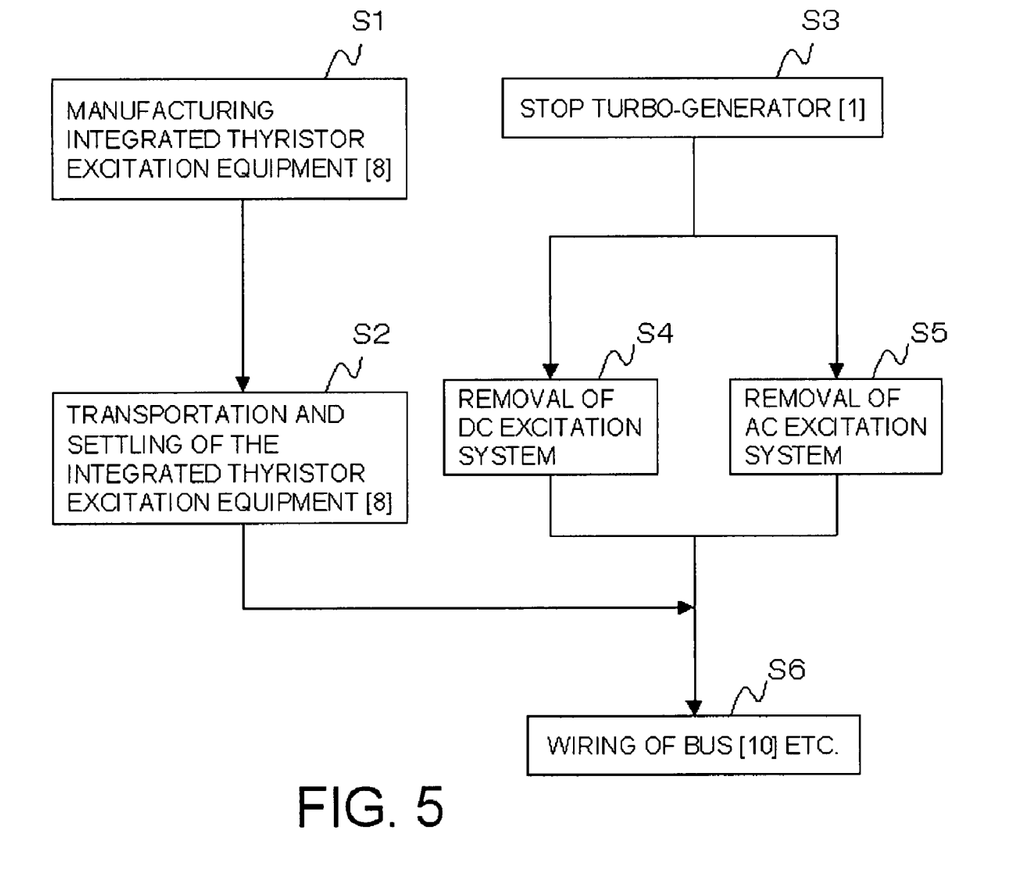
FIG. 5 is a flow diagram showing steps in an installation method of the turbine-generator equipment according to the first embodiment and a second embodiment.

A first embodiment of this invention is explained with reference to the drawings. In this embodiment, a conversion of the turbine-generator equipment from a direct-current excitation system into a thyristor direct excitation system is described. FIG. 1 is a schematic plan view of a main portion of the turbine-generator equipment installed as a thyristor direct excitation system after the conversion. FIG. 2 is a single-line diagram of the turbine-generator equipment of the thyristor direct excitation system. FIG. 3 is a schematic plan view of a main portion of the turbine-generator equipment of a direct-current excitation system before the conversion, and FIG. 4 is a single-line diagram of the direct-current excitation system corresponding to FIG. 3. FIG. 5 is a flow diagram showing steps in an installation method of the turbine-generator equipment according to this embodiment.

Firstly, the turbine-generator equipment, which is a subject of this embodiment, is explained below. In the turbine-generator equipment of a direct-current excitation system shown in FIGS. 3 and 4, a decelerator 12 is directly and axially connected to a turbine-generator (turbo-generator) 1 via an axis 26, and a DC exciter 13 is connected to the decelerator 12 via an axis 27. The turbine-generator 1 is connected with a main bus 2, and a field winding 23 of the turbine-generator 1 is arranged. The field winding 23 is connected to a DC excitation control panel 14 with a DC bus 25 through a collector ring 24 and a DC circuit breaker 6. A field winding 28 connected to the DC excitation control panel 14 via a wiring 29 is arranged as a part of the DC exciter 13. An output of the DC exciter 13 is acquired by controlling the excitation amount of the field winding 28 of the DC exciter 13 by the DC excitation control panel 14, and the output of the DC exciter influences the field winding 23 of the turbine-generator 1 via a DC bus 25. The excitation amount of the turbine-generator 1 is thereby controlled. Additionally, the DC excitation control panel 14 is connected to another low-voltage power source system (not shown). Usually a collector cover 19 containing the collector ring 24, the DC exciter 13 and so on is arranged on a collector side of the turbine-generator 1, and the collector ring 24 in the collector cover 19 connects to the DC circuit breaker 6 with a DC bus.

On the other hand, the converted turbine-generator equipment of the thyristor direct excitation system shown in FIG. 1 and FIG. 2 is composed of the turbine-generator 1, an excitation transformer 4 arranged to be connected to the turbine-generator 1 with a branched bus 9 branched from the main bus 2 connected to the turbine-generator 1, and a power rectifier 5 connected to the excitation transformer 4 with a low-voltage bus 21. The power rectifier 5 is connected to the field winding 23 of the generator via a direct bus 22, and the DC circuit breaker 6 is arranged on the DC bus 22. An excitation control panel 7 is connected to the power rectifier 5 via a wiring 20. In this configuration, the excitation control panel 7 controls a thyristor ignition angle of the power rectifier 5 for directly adjusting the excitation amount of the turbine-generator 1.

This embodiment is concerned with an installation method for converting from established equipment of a direct-current excitation system to a thyristor direct excitation system. FIG. 5 illustrates steps in this conversion. In this embodiment, thyristor excitation equipment is arranged as an integrated system, which is shown Step S1 in FIG. 5. The case where the integrated thyristor excitation equipment 8 is arranged as a single package is described below. Components of the thyristor excitation equipment, i.e., the excitation transformer 4, the power rectifier 5, the DC circuit breaker 6, the excitation control panel 7, the low-voltage bus 11, and so on, are preliminary installed on a package house P. The installation and the wiring of these components on the package house may be performed other than the place where the established turbine-generator equipment was installed, such as at a factory. Thus, irrespective of the status of the turbine-generator equipment 1, i.e., whether it is operating or not, the integrated thyristor excitation equipment 8 may be manufactured in a place other than where the turbine-generator equipment was. This integrated thyristor excitation equipment 8 is composed mainly of components included within the dashed line of the one line diagram shown in FIG. 2. After being manufactured, the preliminary manufactured integrated thyristor excitation equipment 8 is transported and installed outside of the turbine building 18 and near the turbine-generator 1, as shown in FIG. 1. This is illustrated in step S2 of FIG. 5.

After the manufacture step (S1) and the installation step (S2) of the integrated thyristor 8, or simultaneously with the manufacture or the installation, the excitation components of the established direct-current excitation system are removed. The plant is stopped and rotation of the generator is interrupted (S3). Afterwards, the established components shown in FIG. 4, such as the DC exciter 13, the decelerator 12 and the DC excitation control panel 14, are removed (S4).

After the removing step (S4), wiring work of the integrated thyristor excitation equipment is performed (S6). That is, a branched bus 9 is taken out from the main bus 2 and connected to the excitation transformer 4, and DC bus 10 is arranged to connect the DC circuit breaker 6 and the turbine-generator equipment 1. The connection of the DC bus 10 is performed by contacting the collector ring 24 connected to the field winding 23 of the turbine-generator equipment 1 with the DC circuit breaker 6 with a bus 22 via a blush being contacted with the collector ring 24.

Figure 6:
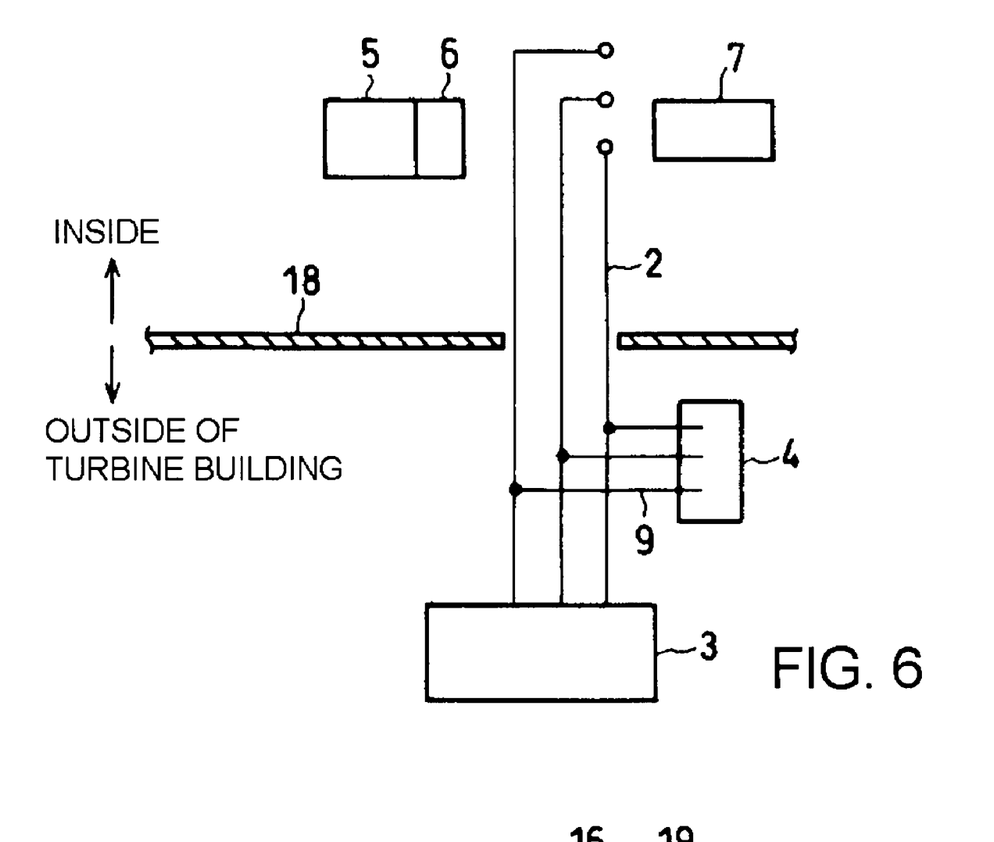
FIG. 6 is a schematic plan view of turbine-generator equipment installed as a thyristor direct excitation system as a comparison example of the first embodiment of the invention.

FIG. 6 is a schematic plan view of turbine-generator equipment installed as a thyristor direct excitation system after conversion as a comparison example to an embodiment of the present invention. In this comparison example, the equipment of the thyristor direct excitation system is shown installed in a newly established plant. Illustration of the turbine-generator 1 is omitted, and only the main bus 2 connected to the turbine-generator 1 is illustrated. The turbine-generator 1 may optionally be installed in a floor other than a floor at which the turbine-generator equipment is installed.

If conversion from the direct-current excitation system whose components layout is shown in FIG. 4 into the thyristor direct excitation system shown in FIG. 6 is performed, after removing the decelerator 12 and DC exciter 13 and other components, the excitation transformer 4, the power rectifier 5, the DC circuit breaker 6 and the excitation control panel 7 are replaced respectively. Each of those components is installed on a corresponding arranged base around the foundation of the turbine-generator 1. In this case, removal or installation of each component must be performed after the turbine-generator 1 is stopped. Thus the time consumed over the entire renewal process becomes long.

On the other hand, in an embodiment according to the present invention, since the integrated thyristor excitation equipment 8 is preliminary manufactured and then installed around the transformer installation 3, i.e., a transformer building or yard, outside of the turbine building 18. Thus, preparatory works such as preliminary foundation work, can be performed even when the plant is in operation. Moreover, the storage components of the thyristor excitation equipment 8, including the excitation transformer 4, the power rectifier 5, the DC circuit breaker 6, the excitation control panel 7 and the low-voltage bus 11 may be manufactured and integrated in the thyristor excitation equipment 8 at a remote location. Therefore, high quality excitation equipment manufactured elsewhere may be used.

Additionally, according to this embodiment, after the integrating the components of the thyristor excitation equipment 8, an adjustment test of the equipment, including a current test among these components, may be performed in the factory where the equipment is made. Thus, the work performed inside the plant after the stopping the plant mainly comprises wiring of cables between the thyristor excitation equipment 8 and the turbine-generator. Thus the work period or process for installation itself can be shortened and simplified. Therefore the operation rate of the system can be improved.

Second Embodiment

The first embodiment mentioned above is a case of converting the turbine-generator equipment from an established direct-current system into a thyristor direct excitation system. A second embodiment, as explained below, is a case of converting the turbine-generator equipment from an established alternating-current system into a thyristor direct excitation system.

Figure 7:
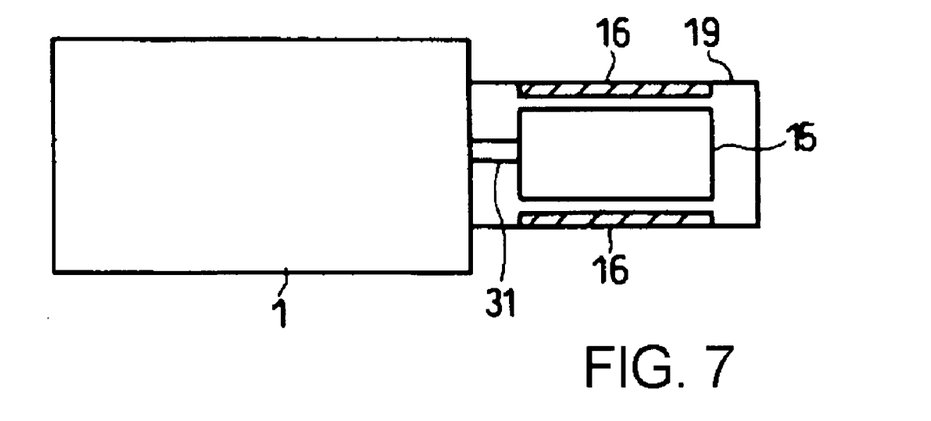
FIG. 7 is a schematic plan view of a main portion of a turbine-generator equipment of an alternating-current excitation system before the conversion according to the first embodiment of the invention.
Figure 8:
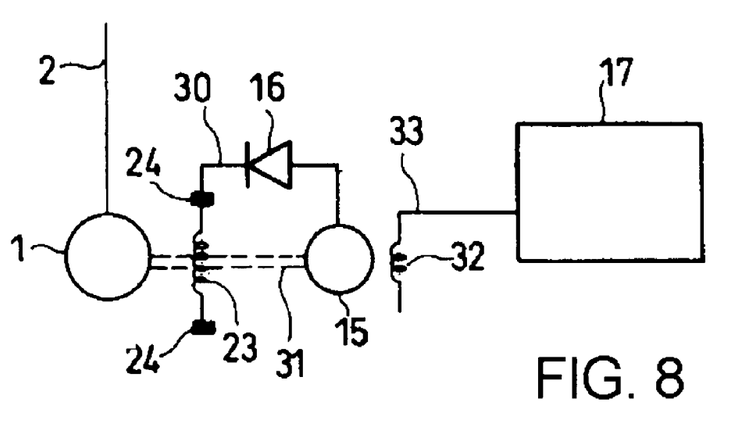
FIG. 8 is a single-line diagram of the alternating-current excitation system corresponding to FIG. 7.
Figure 9:
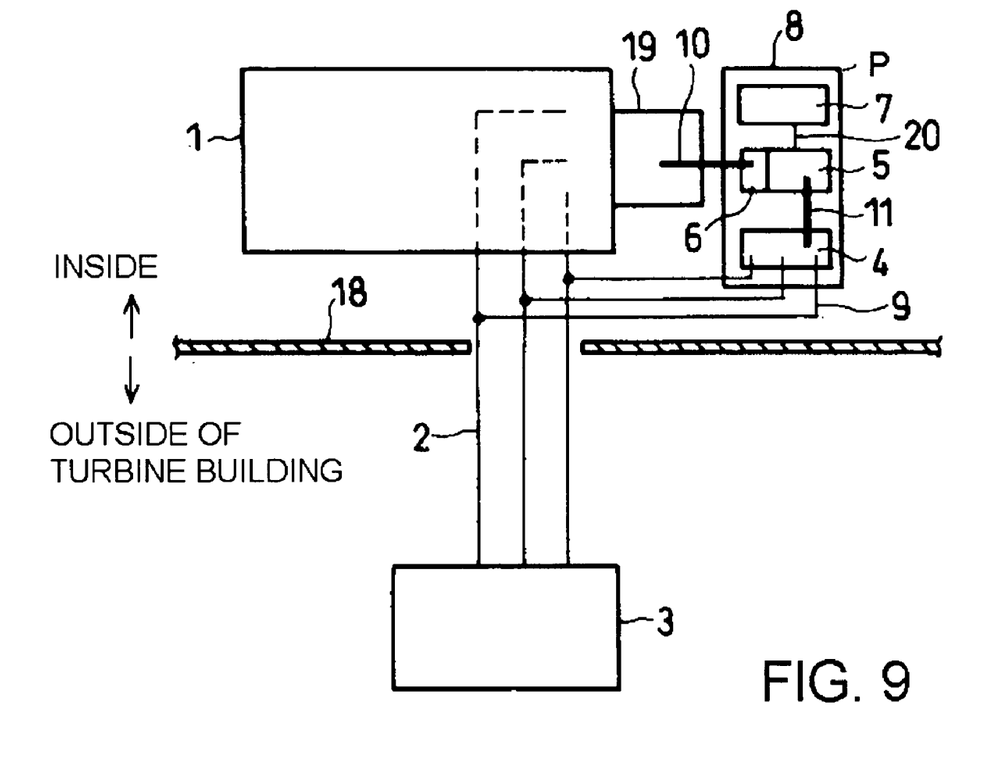
FIG. 9 is a schematic plan view of a main portion of turbine-generator equipment installed as a thyristor direct excitation system after the conversion according to a third embodiment of the invention.

Firstly, the turbine-generator equipment of the alternating-current excitation system is explained below. FIG. 7 is a schematic plan view of a main portion of the turbine-generator equipment of the alternating-current excitation system before the conversion, and FIG. 8 is a single-line diagram of the alternating-current excitation system corresponding to FIG. 7. In the turbine-generator equipment of the alternating-current excitation system, an AC exciter 15 is axially connected to the turbine-generator 1 via an axis 31. The turbine-generator 1 is connected with a main bus 2, and a field winding 23 of the turbine-generator 1 is arranged. The field winding 23 is connected to an AC exciter 15 through a collector ring 24 and a rectifier 16. A field winding 32 connected to the AC excitation control panel 17 via a wiring 33 is arranged as a part of the AC exciter 15. An output of the AC exciter 15 is acquired by controlling the excitation amount of the field winding 32 of the AC exciter 15 by the AC excitation control panel 17. After being rectified by the rectifier 16, the output of the DC exciter influences the field winding 23 of the turbine-generator 1 via a AC bus 30. The excitation amount of the turbine-generator is thereby controlled. Usually a collector cover 19 containing the collector ring 24, the AC exciter 15 and so on is arranged on a collector side of the turbine-generator 1, and the collector ring 24 in the collector cover 19 connects to the rectifier 16 with an AC bus.

In this embodiment, a thyristor excitation equipment 8 is arranged as an integrated system as shown as S1 in FIG. 5 in a similar fashion to the first embodiment. Afterwards, the preliminary manufactured integrated thyristor excitation equipment 8 is transported and installed outside of the turbine building 18 and near the turbine-generator 1 (S2), as shown in FIG. 1 and FIG. 5.

After the manufacture step (S1) and the installation step (S2) of the integrated thyristor 8, or simultaneously with the manufacture or the installation, the excitation components of the established alternating-current excitation system are removed. The plant is stopped and rotation of the generator is interrupted (S3). Afterwards the established components shown in FIG. 8, such as the AC exciter 15 and the AC excitation control panel 17, are removed (S5). After the removing step (S5), wiring work of the branched bus 9 and the DC bus 10 of the integrated thyristor excitation equipment is performed (S6), which is similar to a step of the first embodiment.

According to this embodiment, an effect can be achieved in a similar fashion to the above-mentioned first embodiment even when the established turbine-generator equipment is the alternating-current excitation system. In this embodiment, as compared with the first embodiment, the work performance of the plant as a whole may be slightly decreased. However, because the DC bus 10 connected to the DC circuit breaker 6 becomes relatively short, the number of parts required for leading or supporting of the bus can be decreased and their installation becomes simplified.

Third Embodiment

A third embodiment of this invention is explained below. This embodiment concerns modification of one of the first embodiment and the second embodiment, where the turbine-generator equipment is converted into a thyristor direct excitation system. In this embodiment, the integrated thyristor excitation equipment 8 with the structure described above is preliminary manufactured. After stopping the plant, the established components of the direct-current excitation system such as the DC exciter 13 and the decelerator 12 in FIG. 4 or the alternating-current excitation system such as the AC exciter 15 and the rectifier 16 in FIG. 8 are removed. Afterwards the integrated thyristor excitation equipment 8 is installed on a space at which the established components were, or the vicinity of the space. The installation space may be, for example, an operating floor of the turbine building 18.

After that, wiring is performed inside of the turbine building 18, including extraction of the branched bus 9 from the main bus 2, connection of the branched bus 9 to the excitation transformer 4 and connection of the DC bus 10 between the DC circuit breaker 6 and the turbine-generator 1.

In this embodiment, the wiring connection of a turbo generator 1, the main bus 2, the branch bus 9, or the direct-current bus 10 can easily be made indoors as compared with the above-mentioned embodiments.

In the above-mentioned embodiments, a packaged house including components such as an integrated thyristor excitation system is explained as an example. However, it is not necessary that the integrated equipment comprise a package house when the excitation transformer 4, the power rectifier 5, the DC circuit breaker 6 and the excitation control panel 7 are outdoor type. Thus if it is possible to compose a common base on which the components are integrated and installed and transport the common base and all.

Moreover, in the above-mentioned embodiments, the equipment of the integrated thyristor direct excitation system is explained as comprising a single package. It is also possible, however, to divide a single group of the excitation transformer 4, the power rectifier 5, the DC circuit breaker 6 and the excitation control panel 7 into two groups, thus, a corresponding package of each of the two groups can be made and transported. Thus, the allowable weight of components carried by a crane is considered for the transportation and the installation of the package.

Further, in the above-mentioned embodiments including a step of removal of the established equipment, such as the direct-current excitation system or the alternating-current excitation system, the cases are described as being for renewing and converting the established equipment into a thyristor direct excitation system. However, it is also applicable to a case for introducing the thyristor direct excitation system into other than an established plant, such as a newly-constructed plant. In this case, the removal step of the established equipment is not needed. In this case, a prescribed effect such as decreasing the total work performed in the plant can be achieved.

According to this invention, the conversion into a thyristor direct excitation system in a short installation period from a direct-current excitation system or an exchange excitation system is achieved. Also turbine-generator equipment which easily allows for the additional installation of apparatus or a board is described along with its composition method.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative of, but not limiting to, the scope of the invention, which is set forth in the following claims. Thus, the present invention may be embodied in various ways within the scope of the spirit of the invention.

What is claimed is:

1. A turbine-generator equipment controlling a turbine-generator comprising:
   a thyristor excitation equipment package manufactured and positioned outside a turbine building containing the turbine-generator, comprising:
   an excitation transformer;
   a power rectifier coupled with the excitation transformer;
   an excitation control panel connected to the power rectifier for controlling a thyristor ignition angle of the power rectifier to adjust an excitation amount of the turbine-generator; and
   a circuit breaker;
   a main bus connected with the turbine-generator and to a transformer installation containing a transformer, the transformer installation being outside of both the turbine building and the thyristor excitation equipment package;
   a branched bus, branched from the main bus, connecting with the excitation transformer; and
   a DC bus arranged to connect the circuit breaker and the turbine.

* * * * *